United States Patent
Wang et al.

(10) Patent No.: US 12,242,327 B2
(45) Date of Patent: Mar. 4, 2025

(54) CHIP POWER SUPPLY CIRCUIT AND ELECTRONIC DEVICE

(71) Applicant: Bitmain Technologies Inc., Beijing (CN)

(72) Inventors: Lijun Wang, Beijing (CN); Fei Wu, Beijing (CN)

(73) Assignee: Bitmain Technologies Inc., Beijing (CN)

( * ) Notice: Subject to any disclaimer, the term of this patent is extended or adjusted under 35 U.S.C. 154(b) by 57 days.

(21) Appl. No.: 18/201,742

(22) Filed: May 24, 2023

(65) Prior Publication Data

US 2023/0297160 A1 Sep. 21, 2023

Related U.S. Application Data

(63) Continuation of application No. PCT/CN2021/131288, filed on Nov. 17, 2021.

(30) Foreign Application Priority Data

Nov. 25, 2020 (CN) .......................... 202011346369.X

(51) Int. Cl.
  *G06F 1/32* (2019.01)
  *G06F 1/3296* (2019.01)
(52) U.S. Cl.
  CPC .................. *G06F 1/3296* (2013.01)
(58) Field of Classification Search
  CPC ..................................................... G06F 1/3296
  See application file for complete search history.

(56) References Cited

U.S. PATENT DOCUMENTS

| | | | | |
|---|---|---|---|---|
| 8,935,551 B2* | 1/2015 | Yu | ......................... | G09G 3/3611 345/212 |
| 10,656,665 B2* | 5/2020 | Pelicia | ..................... | G06F 1/263 |
| 11,243,588 B2* | 2/2022 | Zhang | ........................ | G06F 1/26 |
| 2019/0369686 A1* | 12/2019 | Zhang | ........................ | G06F 1/26 |
| 2019/0384339 A1* | 12/2019 | Pelicia | ...................... | G05F 1/56 |

FOREIGN PATENT DOCUMENTS

| | | |
|---|---|---|
| CN | 106774767 A | 5/2017 |
| CN | 107947566 A | 4/2018 |
| CN | 207976832 U | 10/2018 |

(Continued)

*Primary Examiner* — Zahid Choudhury
(74) *Attorney, Agent, or Firm* — MASCHOFF BRENNAN; Liang Huang

(57) ABSTRACT

A chip power supply circuit and an electronic device are provided. The chip power supply circuit includes: one or more chips each comprising a first power supply pin and a second power supply pin; a first voltage regulator circuit connected to the first power supply pin of a corresponding chip of the one or more chips; and a second voltage regulator circuit, where the first power supply pin of the corresponding chip of the one or more chips is connected to the second power supply pin of the corresponding chip via the second voltage regulator circuit, and the second voltage regulator circuit is configured to convert the first voltage into a second voltage. The first voltage regulator circuit and the second voltage regulator circuit are respectively located on different sides of at least one of the one or more chips.

20 Claims, 2 Drawing Sheets

(56) References Cited

FOREIGN PATENT DOCUMENTS

| | | |
|---|---|---|
| CN | 208460057 U | 2/2019 |
| CN | 110869877 A | 3/2020 |
| CN | 111177069 A | 5/2020 |
| RU | 2405247 C1 | 11/2010 |
| RU | 2523115 C1 | 7/2014 |
| WO | 2019120295 A1 | 6/2019 |
| WO | 2020073335 A1 | 4/2020 |

* cited by examiner

CHIP POWER SUPPLY CIRCUIT AND ELECTRONIC DEVICE

CROSS-REFERENCE TO RELATED APPLICATIONS

The present application is a U.S. continuation under 35 U.S.C. § 111(a) of International Application No. PCT/CN2021/131288 filed on Nov. 17, 2021, which claims priority to Chinese Patent Application No. 202011346369.X, filed with the China National Intellectual Property Administration on Nov. 25, 2020, and entitled "CHIP POWER SUPPLY CIRCUIT AND ELECTRONIC DEVICE". The contents of these applications are incorporated herein by reference in their entirety for all purposes.

TECHNICAL FIELD

The present disclosure relates to the field of power supply technologies.

BACKGROUND

Power consumption of a data generation device that needs to perform a huge amount of computation is quite high, and a power supply technology for the data generation device needs to be improved. To maximize conversion efficiency of a power supply, a power supply method based on series-connected chips may be used on a printed circuit board, forming multiple stages of series-connected voltage domains between a power input terminal and a ground terminal. This series power supply architecture can effectively reduce an overall power supply current and improve power conversion efficiency, and can reduce costs of some circuit devices for power conversion.

However, in the prior art, elements of a chip power supply circuit are densely distributed. This increases complexity of routing of a printed circuit board, and further causes poor heat dissipation of a power supply. In addition, if the circuit is used on an Aluminium substrate, serpentine routing is required due to a limited number of layers, and routing space is more limited.

SUMMARY

The present disclosure provides a chip power supply circuit and an electronic device.

According to a an aspect, the present disclosure provides a chip power supply circuit. The circuit includes: at least one chip provided with a first power supply pin and a second power supply pin; a first voltage regulator circuit connected to the first power supply pin of the chip and configured to output a first voltage to the first power supply pin; and a second voltage regulator circuit, where the first power supply pin of the chip is connected to the second power supply pin of the chip via the second voltage regulator circuit, and the second voltage regulator circuit is configured to convert the first voltage into a second voltage and output the second voltage to the second power supply pin, where the first voltage regulator circuit and the second voltage regulator circuit are respectively located on different sides of a chip in the at least one chip.

According to another aspect, the present disclosure provides an electronic device, and the electronic device includes a chip power supply circuit as described above.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It should be understood that terms used in this specification of the present disclosure are only for the purpose of describing specific embodiments, and are not intended to limit the present disclosure. As used in this specification and the appended claims of the present disclosure, the singular forms "a", "an", and "the" are intended to include plural forms, unless otherwise explicitly specified in the context.

It should be further understood that the term "and/or" used in this specification and the appended claims of the present disclosure indicates any combination and all possible combinations of one or more items listed in association, and includes the combinations.

Figure 1:
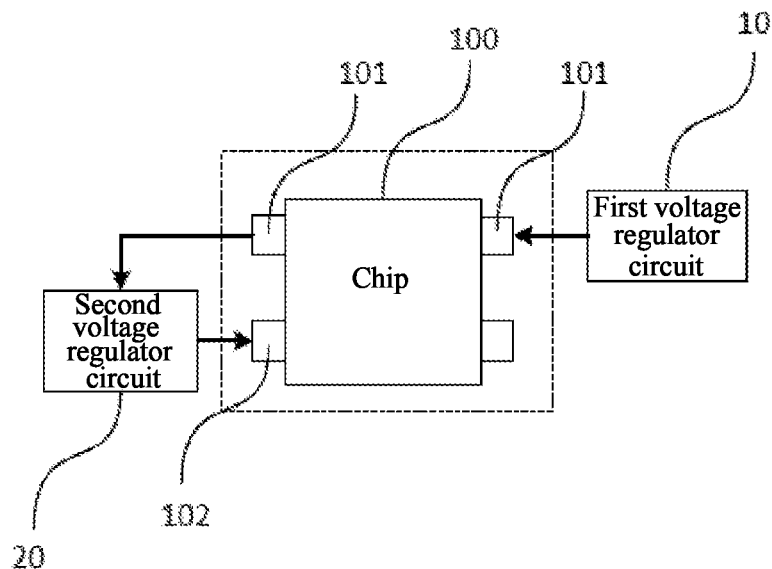
FIG. 1 is a schematic modular diagram of a chip power supply circuit according to an embodiment of the present disclosure.

FIG. 1 is a schematic modular diagram of a chip power supply circuit according to an embodiment of the present disclosure. As shown in FIG. 1, the chip power supply circuit includes at least one chip 100, a first voltage regulator circuit 10, and a second voltage regulator circuit 20.

The chip 100 is provided with a first power supply pin 101 and a second power supply pin 102. The first voltage regulator circuit 10 is connected to the first power supply pin 101 of the chip 100, and is configured to output a first voltage to the first power supply pin 101. The first power supply pin 101 of the chip 100 is connected to the second power supply pin 102 of the chip 100 via the second voltage regulator circuit, and the second voltage regulator circuit 20 is configured to convert the first voltage into a second voltage and output the second voltage to the second power supply pin 102. The first voltage regulator circuit 10 and the second voltage regulator circuit 20 are respectively located on different sides of a chip 100 in the at least one chip 100.

The chip power supply circuit provided in this embodiment of the present disclosure may include one or more chips. Each chip is provided with a first power supply pin and a second power supply pin. The first power supply pin and the second power supply pin need to obtain different voltages, and supply power to the chip at different voltages.

The first voltage regulator circuit may output the first voltage. The first voltage regulator circuit is connected to the first power supply pin of the chip, so that the first voltage regulator circuit can provide the first voltage for the first power supply pin of the chip. The second voltage regulator circuit may output the second voltage. The second voltage regulator circuit is connected to the second power supply pin of the chip, so that the second voltage regulator circuit can provide the second voltage for the second power supply pin of the chip.

An input terminal of the first voltage regulator circuit may be connected to a power supply. The first voltage regulator circuit is configured to convert a voltage of the power supply into the first voltage and supply power to the first power supply pin. After the first voltage regulator circuit supplies power to the first power supply pin of the chip, a potential on the first power supply pin is the first voltage. Therefore, the first power supply pin may serve as a power input to the second voltage regulator circuit. The second voltage regulator circuit is configured to convert the first voltage into the second voltage, and is connected to the second power supply pin.

The first voltage regulator circuit and the second voltage regulator circuit are respectively located on different sides of the chip. If the chip power supply circuit includes one chip, the first voltage regulator circuit and the second voltage regulator circuit are respectively located on different sides of the chip. If the chip power supply circuit includes a plurality of chips, the first voltage regulator circuit and the second voltage regulator circuit may be located on different sides of one of the chips, or may be located on different sides of different chips, provided that the first voltage regulator circuit and the second voltage regulator circuit are not located on the same side of a chip.

The chip power supply circuit may be used in an electronic device performing a huge amount of computation. The electronic device usually includes many chips that require power supply, and accordingly many chip power supply circuits are included. In the prior art, voltage regulator circuits are usually concentrated on one side of a chip. Therefore, when there are a plurality of chip power supply circuits, two voltage regulator circuits of each chip power supply circuit are concentrated on one side. As a result, circuits in a region on the side on which the voltage regulator circuits are located are dense, increasing complexity of routing of a printed circuit board. In addition, heat dissipation of a power supply cannot be optimized.

According to the chip power supply circuit provided in the present disclosure, the first voltage regulator circuit and the second voltage regulator circuit are respectively disposed on different sides of the chip. This can meet a power supply requirement for different voltages of the first power supply pin and the second power supply pin of the chip. In addition, the two voltage regulator circuits can be positioned at different locations to reduce density of routing of a printed circuit board, reduce an area of the printed circuit board, and reduce costs. In addition, a junction temperature of the voltage regulator circuit can be further reduced, thereby improving stability of the chip power supply circuit, and further improving stability of the electronic device.

In an embodiment, the chip 100 includes two first power supply pins 101 respectively located on two sides of the chip 100, and two second power supply pins 102 respectively located on two sides of the chip 100.

The chip may be provided with two first power supply pins and two second power supply pins. The two first power supply pins are connected inside the chip, and the two second power supply pins are connected inside the chip. Usually, pins of the chip are provided on two opposite sides of the chip. The two first power supply pins may be respectively located on two opposite sides of the chip, and the two second power supply pins are also respectively located on two opposite sides of the chip. For example, one first power supply pin and one second power supply pin may be located on one side of the chip, and the other first power supply pin and the other second power supply pin are located on the other side of the chip.

An output terminal of the first voltage regulator circuit may be connected to any first power supply pin, to supply power to the chip at the first voltage. An input terminal of the second voltage regulator circuit may also be connected to any first power supply pin, and an output terminal of the second voltage regulator circuit may be connected to any second power supply pin.

In an embodiment, the first power supply pin is an I/O unit, and the second power supply pin is a PLL unit.

A voltage required for the input/output (I/O) unit is the first voltage. In some embodiments, the first voltage may be 1.8 volts. A voltage required for the phase locked loop (PLL) unit is the second voltage. In some embodiments, the second voltage is 0.8 volts.

In an embodiment, the first voltage regulator circuit 10 and/or the second voltage regulator circuit 20 are low dropout regulators. A low dropout regulator (LDO) uses a transistor or a field effect transistor (FET) operating in a saturation region of the low dropout regulator to subtract an excess voltage from an input voltage and output a regulated voltage.

In an embodiment, the chip power supply circuit includes one chip 100, and the first voltage regulator circuit 10 and the second voltage regulator circuit 20 are respectively located on two sides of the chip 100; and an output terminal of the first voltage regulator circuit 10 is connected to a first power supply pin 101 on a first side of the chip 100, and a first power supply pin 101 on a second side of the chip 100 is connected to a second power supply pin 102 on the second side of the chip 100 via the second voltage regulator circuit 20.

As shown in FIG. 1, the chip power supply circuit includes only one chip 100. The first voltage regulator circuit 10 and the second voltage regulator circuit 20 may be respectively disposed on two sides of the chip 100, and the two first power supply pins and the two second power supply pins each are respectively disposed on two sides of the chip 100.

Therefore, the output terminal of the first voltage regulator circuit 10 may be connected to the first power supply pin 101 on the first side of the chip 100, so that the first voltage regulator circuit 10 can provide the first voltage for the first power supply pin 101. In addition, the input terminal of the second voltage regulator circuit 20 located on the second side may be connected to the first power supply pin 101 on the second side of the chip 100, and the output terminal of the second voltage regulator circuit 20 may be connected to the second power supply pin 102 on the second side of the chip 100, so that the second voltage regulator circuit 20 can convert the first voltage into the second voltage and provide the second voltage for the second power supply pin 102.

Figure 2:
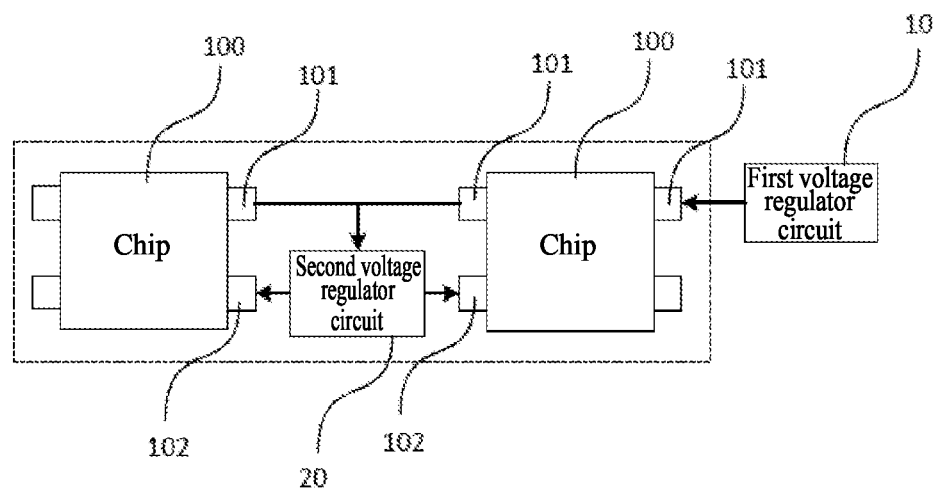
FIG. 2 is a schematic modular diagram of another chip power supply circuit according to an embodiment of the present disclosure.
Figure 3:
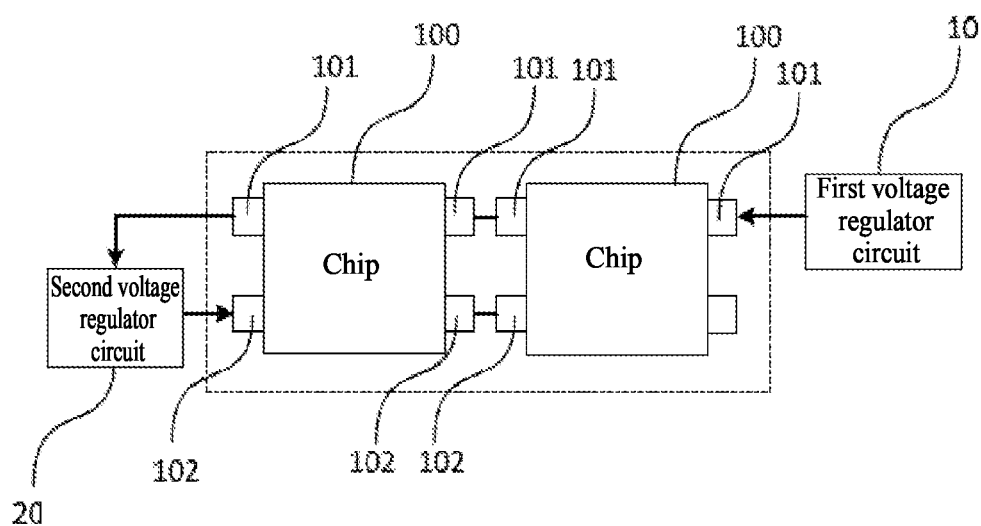
FIG. 3 is a schematic modular diagram of another chip power supply circuit according to an embodiment of the present disclosure.
Figure 4:
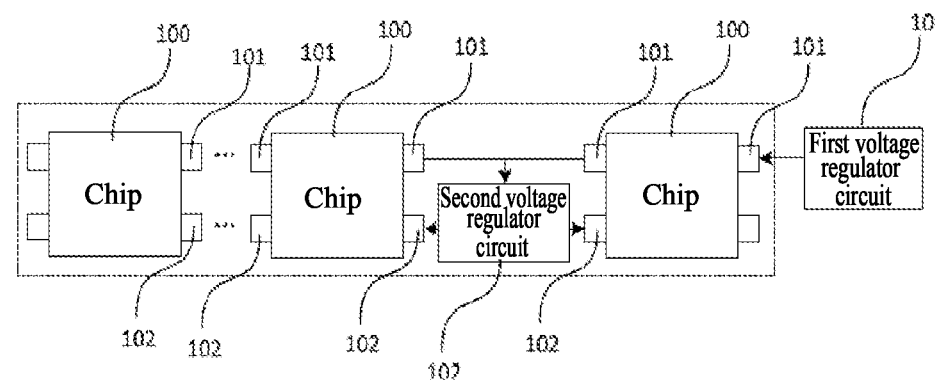
FIG. 4 is a schematic modular diagram of another chip power supply circuit according to an embodiment of the present disclosure.

In an embodiment, as shown in FIG. 2 to FIG. 4, the chip power supply circuit includes at least two chips 100 that are sequentially connected, and in two adjacent chips 100, a first power supply pin 101 on a second side of a previous chip 100 is connected to a first power supply pin 101 on a first side of a next chip 100, and a second power supply pin 102 on the second side of the previous chip 100 is connected to a second power supply pin 102 on the first side of the next chip 100.

The at least two chips are connected in series via first power supply pins, and are connected in series via second power supply pins. The at least two chips are connected in series, so that power can be supplied to a plurality of chips in series. Once the first voltage is provided for a first power supply pin of one chip, voltages on first power supply pins of all chips in the series circuit are the first voltage. Similarly, once the second voltage is provided only for a second power supply pin of one chip, voltages on second power supply pins of all chips in the series circuit are the second voltage.

The first voltage regulator circuit 10 is located on a first side of the first chip 100, and the output terminal of the first voltage regulator circuit 10 is connected to a first power supply pin 101 on the first side of the first chip 100.

The first voltage regulator circuit needs to be connected to the power supply. Therefore, the first voltage regulator circuit may be connected to the first side of the first chip in the chip power supply circuit, namely, an outermost side of the chip power supply circuit. The input terminal of the first voltage regulator circuit may be connected to the power supply, and the output terminal of the first voltage regulator circuit may be connected to the first power supply pin on the first side of the first chip. Therefore, the first voltage regulator circuit may provide the first voltage for the first power supply pins of all chips in the entire series circuit.

In an embodiment, the second voltage regulator circuit 20 is located on a second side of the last chip 100, and a first power supply pin 101 on the second side of the last chip 100 is connected to a second power supply pin on the second side of the last chip 100 via the second voltage regulator circuit 20.

The second voltage regulator circuit is located on the second side of the last chip, that is, the second voltage regulator circuit is located on the other outermost side of the chip power supply circuit. The first voltage regulator circuit and the second voltage regulator circuit are respectively located on the two outermost sides of the chip power supply circuit. The first power supply pin on the second side of the last chip is connected to the input terminal of the second voltage regulator circuit, so that the first voltage can be input to the second voltage regulator circuit. The output terminal of the second voltage regulator circuit is connected to the second power supply pin on the second side of the last chip, so that the second voltage regulator circuit converts the voltage into the second voltage and provides the second voltage for the second power supply pins of all chips in the entire series circuit.

Figure 5:
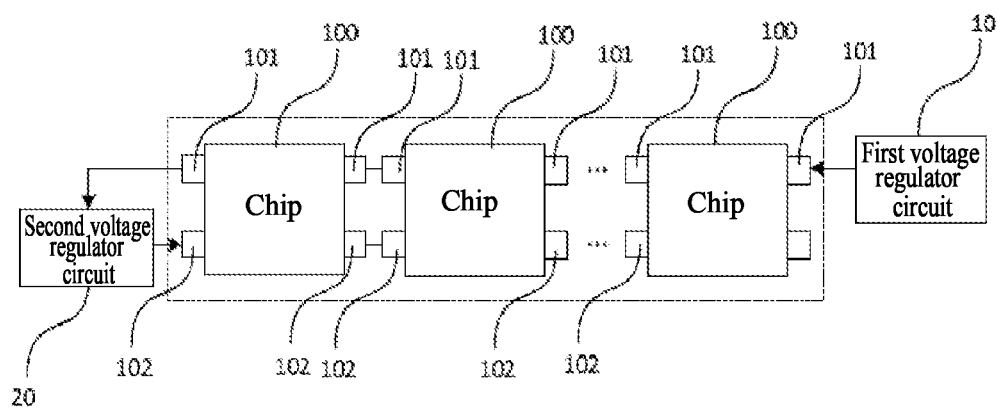
FIG. 5 is a schematic modular diagram of another chip power supply circuit according to an embodiment of the present disclosure.

It should be noted that the first voltage regulator circuit and the second voltage regulator circuit can be respectively disposed on the two outermost sides of the chip power supply circuit regardless of whether the chip power supply circuit includes two chips or more than two chips, as shown in FIG. 3 and FIG. 5. In FIG. 3, the chip power supply circuit includes two chips. In FIG. 5, the chip power supply circuit includes more than two chips.

In an embodiment, the second voltage regulator circuit 20 is located between any two adjacent chips 100, and in the two adjacent chips 100, a first power supply pin 101 on a second side of a previous chip 100 and a first power supply pin 101 on a first side of a next chip 100 are both connected to the input terminal of the second voltage regulator circuit 20, and a second power supply pin 102 on the second side of the previous chip 100 and a second power supply pin 102 on the first side of the next chip 100 are both connected to the output terminal of the second voltage regulator circuit 20.

If the chip power supply circuit includes two chips, the second voltage regulator circuit may be located between the two chips. As shown in FIG. 2, a first power supply pin 101 on a second side of a previous chip 100 and a first power supply pin 101 on a first side of a next chip 100 are both connected to the input terminal of the second voltage regulator circuit 20, so that the first voltage is provided for the second voltage regulator circuit 20. A second power supply pin 102 on the second side of the previous chip 100 and a second power supply pin 102 on the first side of the next chip 100 are both connected to the output terminal of the second voltage regulator circuit 20, so that the second voltage regulator circuit 20 can supply power to the second power supply pins 102 of the two chips 100 at the second voltage obtained through conversion.

If the chip power supply circuit includes more than two chips, the second voltage regulator circuit may be located between any two adjacent chips. As shown in FIG. 4, in the two adjacent chips 100, a first power supply pin 101 on a second side of a previous chip 100 and a first power supply pin 101 on a first side of a next chip 100 are both connected to the input terminal of the second voltage regulator circuit 20, so that the first voltage is provided for the second voltage regulator circuit 20. A second power supply pin 102 on the second side of the previous chip 100 and a second power supply pin 102 on the first side of the next chip 100 are both connected to the output terminal of the second voltage regulator circuit 20, so that the second voltage regulator circuit 20 can supply power to second power supply pins 102 of the chips in the series circuit at the second voltage obtained through conversion.

An embodiment of the present disclosure further provides an electronic device, and the electronic device includes a chip power supply circuit of any one of the foregoing embodiments. The electronic device may include a plurality of chip power supply circuits.

In an embodiment, the electronic device is a data generation device.

The foregoing descriptions are merely specific implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A chip power supply circuit, comprising:
    one or more chips each comprising a first power supply pin and a second power supply pin;
    a first voltage regulator circuit connected to the first power supply pin of a corresponding chip of the one or more chips and configured to output a first voltage to the first power supply pin; and
    a second voltage regulator circuit, wherein the first power supply pin of the corresponding chip of the one or more chips is connected to the second power supply pin of the corresponding chip via the second voltage regulator circuit, and the second voltage regulator circuit is configured to convert the first voltage into a second voltage and output the second voltage to the second power supply pin of the corresponding chip, wherein the first voltage regulator circuit and the second voltage regulator circuit are respectively located on different sides of at least one of the one or more chips.

2. The chip power supply circuit of claim 1, wherein:

each chip of the one or more chips comprises an additional first power supply pin and an additional second power supply pin, the first power supply pin and the additional first power supply pin form two first power supply pins respectively located on two sides of the chip, and the second power supply pin and the additional second power supply pin form two second power supply pins respectively located on the two sides of the chip.

3. The chip power supply circuit of claim 2, wherein:

the chip power supply circuit comprises one chip, and the first voltage regulator circuit and the second voltage regulator circuit are respectively located on the two sides of the chip;

the two first power supply pins comprise a first power supply pin on a first side of the chip and a first power supply pin on a second side of the chip;

the two second power supply pins comprise a second power supply pin on the first side of the chip and a second power supply pin on the second side of the chip; and an output terminal of the first voltage regulator circuit is connected to the first power supply pin on the first side of the chip, and the first power supply pin on the second side of the chip is connected to the second power supply pin on the second side of the chip via the second voltage regulator circuit.

4. The chip power supply circuit of claim 2, wherein:

the one or more chips comprise at least two chips that are sequentially connected, the at least two chips comprising a previous chip and a next chip adjacent to each other, in the previous and next chips, the first power supply pin on a second side of the previous chip is connected to the first power supply pin on a first side of the next chip, and the second power supply pin on the second side of the previous chip is connected to the second power supply pin on the first side of the next chip;

the first voltage regulator circuit is located on the first side of a first chip of the at least two chips, and an output terminal of the first voltage regulator circuit is connected to the first power supply pin on the first side of the first chip; and the second voltage regulator circuit is located on the second side of a last chip of the at least two chips, and the first power supply pin on the second side of the last chip is connected to the second power supply pin on the second side of the last chip via the second voltage regulator circuit.

5. The chip power supply circuit of claim 2, wherein:

the one or more chips comprise at least two chips that are sequentially connected, in two adjacent chips of the at least two chips, the first power supply pin on a second side of a previous chip is connected to the first power supply pin on a first side of a next chip, and the second power supply pin on the second side of the previous chip is connected to the second power supply pin on the first side of the next chip;

the first voltage regulator circuit is located on the first side of a first chip of the at least two chips, and an output terminal of the first voltage regulator circuit is connected to the first power supply pin on the first side of the first chip; and the second voltage regulator circuit is located between any two adjacent chips of the at least two chips, and in the two adjacent chips, the first power supply pin on the second side of a previous chip and the first power supply pin on the first side of a next chip are both connected to an input terminal of the second voltage regulator circuit, and the second power supply pin on the second side of the previous chip and the second power supply pin on the first side of the next chip are both connected to an output terminal of the second voltage regulator circuit.

6. The chip power supply circuit of claim 1, wherein the first power supply pin is an I/O unit, and the second power supply pin is a phase locked loop (PLL) unit.

7. The chip power supply circuit of claim 1, wherein the first voltage is greater than the second voltage.

8. The chip power supply circuit of claim 6, wherein the first voltage is greater than the second voltage.

9. The chip power supply circuit of claim 1, wherein the first voltage regulator circuit is a low dropout regulator.

10. The chip power supply circuit of claim 1, wherein the second voltage regulator circuit is a low dropout regulator.

11. The chip power supply circuit of claim 9, wherein the second voltage regulator circuit is a low dropout regulator.

12. An electronic device, comprising a chip power supply circuit, wherein the chip power supply circuit comprises:

one or more chips each comprising a first power supply pin and a second power supply pin;

a first voltage regulator circuit connected to the first power supply pin of a corresponding chip of the one or more chips and configured to output a first voltage to the first power supply pin; and a second voltage regulator circuit, wherein the first power supply pin of the corresponding chip of the one or more chips is connected to the second power supply pin of the corresponding chip via the second voltage regulator circuit, and the second voltage regulator circuit is configured to convert the first voltage into a second voltage and output the second voltage to the second power supply pin of the corresponding chip, wherein the first voltage regulator circuit and the second voltage regulator circuit are respectively located on different sides of at least one of the one or more chips.

13. The electronic device of claim 12, wherein:

each chip of the one or more chips comprises an additional first power supply pin and an additional second power supply pin, the first power supply pin and the additional first power supply pin form two first power supply pins respectively located on two sides of the chip, and the second power supply pin and the additional second power supply pin form two second power supply pins respectively located on the two sides of the chip.

14. The electronic device of claim 13, wherein:

the chip power supply circuit comprises one chip, and the first voltage regulator circuit and the second voltage regulator circuit are respectively located on the two sides of the chip;

the two first power supply pins comprise a first power supply pin on a first side of the chip and a first power supply pin on a second side of the chip;

the two second power supply pins comprise a second power supply pin on the first side of the chip and a second power supply pin on the second side of the chip; and an output terminal of the first voltage regulator circuit is connected to a first power supply pin on the first side of the chip, and the first power supply pin on the second side of the chip is connected to the second power supply pin on the second side of the chip via the second voltage regulator circuit.

15. The electronic device of claim 13, wherein:

the one or more chips comprise at least two chips that are sequentially connected, the at least two chips comprising a previous chip and a next chip adjacent to each other, in the previous and next chips, the first power supply pin on a second side of the previous chip is connected to the first power supply pin on a first side of the next chip, and the second power supply pin on the second side of the previous chip is connected to the second power supply pin on the first side of the next chip;

the first voltage regulator circuit is located on the first side of a first chip of the at least two chips, and an output terminal of the first voltage regulator circuit is connected to the first power supply pin on the first side of the first chip; and the second voltage regulator circuit is located on the second side of a last chip of the at least two chips, and the first power supply pin on the second side of the last chip is connected to the second power supply pin on the second side of the last chip via the second voltage regulator circuit.

16. The electronic device of claim 13, wherein:

the one or more chips comprise at least two chips that are sequentially connected, in two adjacent chips of the at least two chips, the first power supply pin on a second side of a previous chip is connected to the first power supply pin on a first side of a next chip, and the second power supply pin on the second side of the previous chip is connected to the second power supply pin on the first side of the next chip;

the first voltage regulator circuit is located on the first side of a first chip of the at least two chips, and an output terminal of the first voltage regulator circuit is connected to the first power supply pin on the first side of the first chip; and the second voltage regulator circuit is located between any two adjacent chips of the at least two chips, and in the two adjacent chips, the first power supply pin on the second side of a previous chip and the first power supply pin on the first side of a next chip are both connected to an input terminal of the second voltage regulator circuit, and the second power supply pin on the second side of the previous chip and the second power supply pin on the first side of the next chip are both connected to an output terminal of the second voltage regulator circuit.

17. The electronic device of claim 12, wherein the first power supply pin is an I/O unit, and the second power supply pin is a PLL unit.

18. The electronic device of claim 12, wherein the first voltage is greater than the second voltage.

19. The electronic device of claim 12, wherein at least one of the first voltage regulator circuit or the second voltage regulator circuit is a low dropout regulator.

20. The electronic device of claim 12, wherein the electronic device is a data generation device.

* * * * *